UNITED STATES PATENT OFFICE.

H. BIEBUYCK, OF BRUSSELS, BELGIUM.

IMPROVED BLASTING-POWDER.

Specification forming part of Letters Patent No. 36,599, dated October 7, 1862.

*To all whom it may concern:*

Be it known that I, HYPOLITE BIEBUYCK, of Brussels, in the Kingdom of Belgium, have invented certain new and useful Improvements in the Manufacture of Mining and other Descriptions of Powder; and I hereby declare the following to be a full, clear, and exact description of the same.

Blasting or mining powder as heretofore made is but a slight modification of the ordinary gunpowder—a substance dangerous to handle, too sudden in its action, and filling the galleries of mines with dense fumes, necessitating the temporary suspension of the work.

The application to mining purposes of powder composed of saltpeter, sulphur, and charcoal has been found to be objectionable because of its too sudden combustion and generation of gases, whose expansion against the sides of the hole in the rock is instantaneous in its action; and it has been found that mining-powder, in order that it may act with power and reliability, should, when ignited, produce effects entirely different from those produced by ordinary gunpowder. The principal object sought to be attained in the manufacture of blasting-powder is to render the generation of gases more regular and less rapid, so that the pressure exerted by said gases shall produce effects similar to those produced by wooden wedges when expanded by their absorbing water. To effect this object a variation in the proportions or nature of ingredients was heretofore resorted to. Thus for charcoal sugar, starch, or sawdust were substituted; but these substances are either more expensive than the ordinary constituents of gunpowder or do not allow of that intimate and homogeneous mixture without which no regular, steady, and reliable effects can be produced. The changes or variations, whatever they may have been, were confined to the ingredients other than the saltpeter or the nitrate of potash. Attempts have been made, for reasons of economy, to use nitrate of soda instead of nitrate of potash; but powders thus made absorb moisture to such extent as to become useless when exposed to open air. Nitrate of potash, being an anhydrous salt not at all hygroscopic and comparatively cheap, is indeed the only substance which appears to present all the advantages which render its application in the manufacture of gun or mining powder indispensable. Nitrates of different bases, and most of the chlorates, chromates, &c., although capable of furnishing a quantity of oxygen sufficient for rapid combustion, are either too expensive or too weak. Yet there is one nitrate which is anhydrous, not hygroscopic, and which may be substituted for nitrate of potash. I refer to the nitrate of baryta. This salt, on account of its high price, was never employed in the manufacture of powder, and never used, with the exception, perhaps, of few laboratory operations or pyrotechnical compositions.

My invention consists in the employment in the manufacture of gun or mining powder of nitrate of baryta in the manner hereinafter to be described.

Carbonate and sulphate of baryta are minerals readily found in abundant quantities in most countries. To convert this into nitrate is or may be done in the following manner: The carbonate of baryta, if treated by hydrochloric acid, produces chloride of barium. The sulphate of baryta calcined with charcoal gives sulphide of barium, which may be transformed into chloride by means of hydrochloric acid. The latter may be had at a very small cost at soda-factories. The hydrosulphuric acid generated during the treatment, as above described, may be utilized and consumed to produce sulphuric acid in lead chambers, as well known. Now, if chloride of manganese (the waste of the manufacture of chlorine and chlorides) be added to the sulphide of barium, obtained as above, chloride of barium will be obtained. Calcination of a mixture of chloride of manganese, sulphate of baryta, and charcoal will also produce chloride of barium. Again, by heating to red a mixture of chloride of calcium and sulphate of baryta, sulphate of lime and chloride of barium will be obtained. The latter—*i. e.*, the chloride of barium—may then be separated from the former by rapid washing.

Having thus shown how chloride of barium is or may be obtained, I shall now proceed to describe the manner of converting the same into nitrate of baryta. This is effected by double decomposition by mixing at a high temperature the concentrated solution of chloride of barium with an equally concentrated solution of natural nitrate of soda. Nitrate of baryta will thus be precipitated and will crystallize in a nearly-pure state as the solution cools down. The quantity of water used in the solution should be sufficient to prevent the precipitation of the chloride of sodium, which is formed simultaneously with the nitrate of baryta. The operation, however, is conducted in the same manner as that of the conversion by nitrate of soda of the chloride of potassium into saltpeter. The nitrate of baryta requires but few washings in order to bring it to a state of desirable purity.

From the mother-liquor may be derived culinary salt by evaporating and consequent concentration; and by cooling nitrate of baryta may also be obtained. The remaining portions of the mother-liquor are brought back to the first crystallizing-tank, and are treated over again. This process therefore produces no waste. Nitrate of baryta may also be obtained by treating the sulphide of barium with the nitrate of soda, and by allowing the product to crystallize at a sufficiently high temperature.

The manufacture of blasting-powder by means of nitrate of baryta presents no difficulty whatever. The operations are precisely like those used in the manufacture of gunpowder by means of nitrate of potash. Thus the processes of mixing the ingredients, of forming the cakes, and of powdering or granulating the compound are alike in both. To give the powder in cakes more adhesiveness and density, I use water rendered mucilaginous by means of a small quantity of starch or dextrine. More or less vivacity may be imparted to the powder by mixing with its ingredients more or less saltpeter—taking place of so much nitrate of baryta. As regards the proportion of the ingredients of powder made with nitrate of baryta, they may and should be varied within certain limits, according to the work or the result desired to be obtained from the powder. The following compound produces satisfactory results:

| | |
|---|---|
| Nitrate of baryta | 77 |
| Charcoal | 21 |
| Saltpeter | 2 |
| | 100 |

The saltpeter is dissolved in a quantity of water sufficient to moisten the charcoal and to be entirely absorbed by it. The quantity of saltpeter thus employed, although quite small, increases both the combustibility of the charcoal and the vivacity of the powder. After the charcoal is dried, it is mixed with the nitrate of baryta and grained in the usual manner. The saltpeter may be added by dissolving it in the water used for wetting the cake.

In the above compound it will be perceived that sulphur is omitted. This I deem preferable, for not only is the compound without sulphur sufficiently inflammable and combustible, but the presence of sulphurous gases is always a source of great annoyance in mines.

Having thus described my improvements in the manufacture of blasting and other descriptions of powder, I do not wish to be understood as claiming as my invention processes hereinbefore described of preparing the baryta salts, excepting such features as are new and relating particularly to the manufacture of powder; but

I do claim—

The use, in the manufacture of blasting-powder, of nitrate of baryta, whether combined with nitrate of potash or not, substantially as herein set forth.

In testimony whereof I have signed my name to this specification before two subscribing witnesses.

H. BIEBUYCK.

Witnesses:
  E. JAUME,
  BLÉTRY.